US012621447B2

(12) United States Patent
Norvell et al.

(10) Patent No.: US 12,621,447 B2
(45) Date of Patent: May 5, 2026

(54) ADAPTIVE PREDICTIVE ENCODING

(71) Applicant: Telefonaktiebolaget LM Ericsson (publ), Stockholm (SE)

(72) Inventors: Erik Norvell, Upplands Väsby (SE); Fredrik Jansson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/720,235

(22) PCT Filed: Dec. 15, 2021

(86) PCT No.: PCT/EP2021/085932
§ 371 (c)(1),
(2) Date: Jun. 14, 2024

(87) PCT Pub. No.: WO2023/110082
PCT Pub. Date: Jun. 22, 2023

(65) Prior Publication Data
US 2025/0063162 A1 Feb. 20, 2025

(51) Int. Cl.
H04N 19/117 (2014.01)
H04N 19/103 (2014.01)
H04N 19/46 (2014.01)
H04N 19/80 (2014.01)

(52) U.S. Cl.
CPC ......... H04N 19/117 (2014.11); H04N 19/103 (2014.11); H04N 19/46 (2014.11); H04N 19/80 (2014.11)

(58) Field of Classification Search
CPC .... H04N 19/117; H04N 19/103; H04N 19/46; H04N 19/80
See application file for complete search history.

(56) References Cited

U.S. PATENT DOCUMENTS

| | | | |
|---|---|---|---|
| 2005/0261892 A1 | 11/2005 | Makinen et al. | |
| 2009/0187409 A1 | 7/2009 | Krishnan et al. | |
| 2010/0309978 A1* | 12/2010 | Shimada | H04N 19/11 375/E7.243 |
| 2012/0093213 A1 | 4/2012 | Moriya et al. | |
| 2014/0247890 A1* | 9/2014 | Yamaguchi | H04N 19/172 375/240.29 |
| 2015/0010070 A1* | 1/2015 | Yamauchi | H04N 19/19 375/240.12 |
| 2015/0215621 A1 | 7/2015 | Liu et al. | |

(Continued)

FOREIGN PATENT DOCUMENTS

| | | | |
|---|---|---|---|
| EP | 3962080 | * | 8/2020 |
| JP | 2000287216 | * | 3/1999 |

(Continued)

OTHER PUBLICATIONS

Hamanaka translation of JP 2000287216 Mar. 31, 1999 (Year: 1999).*

(Continued)

*Primary Examiner* — Zaihan Jiang
(74) *Attorney, Agent, or Firm* — Sage Patent Group

(57) ABSTRACT

A method performed in an encoder for selecting a coding mode for a current frame includes obtaining bit rates for absolute coding and predictive coding. The method includes calculating a bit rate difference based on the bit rates obtained. The method includes low-pass filtering the bit rate difference. The method includes selecting a coding mode based on the bit rate difference, the low-pass filtered bit rate difference, and a predictive mode counter.

24 Claims, 9 Drawing Sheets

(56) References Cited

U.S. PATENT DOCUMENTS

| | | | | |
|---|---|---|---|---|
| 2016/0027450 A1 | 1/2016 | Gao | | |
| 2018/0137873 A1 | 5/2018 | Moriya et al. | | |
| 2020/0099945 A1* | 3/2020 | Pham Van | ........... | H04N 19/176 |
| 2020/0112728 A1* | 4/2020 | Ramasubramonian | ...................... | |
| | | | | H04N 19/176 |
| 2020/0112740 A1* | 4/2020 | Chien | .................. | H04N 19/513 |
| 2020/0213622 A1* | 7/2020 | Xu | ........................ | H04N 19/139 |
| 2020/0336736 A1* | 10/2020 | Li | ........................ | H04N 19/109 |
| 2021/0258614 A1* | 8/2021 | Xu | ........................ | H04N 19/105 |
| 2023/0171412 A1* | 6/2023 | Zhao | .................... | H04N 19/103 |
| | | | | 375/240.12 |

FOREIGN PATENT DOCUMENTS

| | | | | |
|---|---|---|---|---|
| JP | WO2003021971 | * | 8/2002 | |
| JP | 2003-515178 A | | 4/2003 | |
| JP | 2016-507789 A | | 3/2016 | |
| WO | 01/31639 A1 | | 5/2001 | |
| WO | 2010/140546 A1 | | 12/2010 | |
| WO | 2014/130085 A1 | | 8/2014 | |
| WO | 2014168877 A1 | | 10/2014 | |

OTHER PUBLICATIONS

Mitsuru Kobayashi translation of JP WO2003021971 Aug. 28, 2002 (Year: 2002).*
International Search Report and Written Opinion of the International Searching Authority, PCT/EP2021/085932, mailed Aug. 4, 2022, 14 pages.
Japanese Office Action and English Translation, Japanese Patent Application No. 2024-535616, mailed Aug. 19, 2025, 12 pages.
Office Action, mailed Feb. 26, 2026, Indian Patent Application No. 202417034523, 7 pages.

* cited by examiner

ADAPTIVE PREDICTIVE ENCODING

CROSS REFERENCE TO RELATED APPLICATIONS

This application is a 35 U.S.C. § 371 national stage application of PCT International Application No. PCT/EP2021/085932 filed on Dec. 15, 2021, the disclosure and content of which is incorporated by reference herein in its entirety.

TECHNICAL FIELD

The present disclosure relates generally to communications, and more particularly to communication methods and related devices and nodes supporting wireless communications.

BACKGROUND

In communications networks, there may be a challenge to obtain good performance and capacity for a given communications protocol, its parameters and the physical environment in which the communications network is deployed.

For example, although the capacity in telecommunication networks is continuously increasing, it is still of interest to limit the required resource usage per user. In mobile telecommunication networks, less required resource usage per call means that the mobile telecommunication network can service a larger number of users in parallel. Lowering the resource usage also yields lower power consumption in both the devices at the user-side (such as in terminal devices) and the devices at the network-side (such as in network nodes). This translates to energy and cost saving for the network operator, whilst enabling prolonged battery life and increased talk-time to be experienced in the terminal devices.

One mechanism for reducing the required resource usage for speech communication applications in mobile telecommunication networks is to exploit natural pauses in the speech. In more detail, in most conversations only one party is active at a time, and thus the speech pauses in one communication direction will typically occupy more than half of the signal. One way to utilize this property in order to decrease the required resource usage is to employ a Discontinuous Transmission (DTX) system, where the active signal encoding is discontinued during speech pauses.

During speech pauses it is common to transmit a very low bit rate encoding of the background noise to allow for a Comfort Noise Generator (CNG) system at the receiving end to fill pauses with a background noise having similar characteristics as the original noise. The CNG makes the sound more natural compared to having silence in the speech pauses since the background noise is maintained and not switched on and off together with the speech. Complete silence in the speech pauses is commonly perceived as annoying and often leads to the misconception that the call has been disconnected.

A DTX system might further rely on a Voice Activity Detector (VAD), which indicates to the transmitting device whether to use active signal encoding or low rate background noise encoding. In this respect, the transmitting device might be configured to discriminate between other source types by using a (Generic) Sound Activity Detector (GSAD or SAD), which not only discriminates speech from background noise but also might be configured to detect music or other signal types, which are deemed relevant.

Communication services may be further enhanced by supporting stereo or multichannel audio transmission. In these cases, the DTX/CNG system might also consider the spatial characteristics of the signal in order to provide a comfort noise that is pleasant-sounding.

A common mechanism to generate comfort noise is to transmit information about the energy and spectral shape of the background noise in the speech pauses. This can be done using significantly lower number of bits than the regular coding of speech segments.

At the receiving device side the comfort noise is generated by creating a pseudo random signal and then shaping the spectrum of the signal with a filter based on information received from the transmitting device. The signal generation and spectral shaping can be performed in the time or the frequency domain.

For stereo operation additional parameters are transmitted to the receiving side. In a typical stereo signal, the channel pair shows a high degree of similarity, or correlation. Current state-of-the-art stereo coding schemes exploit this correlation by employing parametric coding, where a single channel is encoded with high quality and complemented with a parametric description that allows to reconstruct the full stereo image. The process of reducing the channel pair into a single channel is often called a down-mix and the resulting channel the down-mix channel. The down-mix procedure typically tries to maintain the energy by aligning inter-channel time differences (ITD) and inter-channel phase differences (IPD) before mixing the channels. To maintain the energy balance of the input signal, the inter-channel level difference (ILD) is also measured. The ITD, IPD and ILD are then encoded and may be used in a reversed up-mix procedure when reconstructing the stereo channel pair at a decoder.

Most audio coding systems process the input audio signal in segments, often called frames. For stable audio scenes, the stereo parameters will show a high degree of similarity between adjacent frames. To exploit this similarity, predictive coding schemes are typically applied. In such a scheme a prediction of the current frame parameters is derived based on the past decoded parameters, and the difference to the true parameters is what is encoded and transmitted between the sender and the receiver. A simple but efficient prediction is to use the last decoded parameters as the prediction, in which case the predictive coding scheme can also be referred to as a differential encoding scheme.

SUMMARY

An issue with the predictive coding schemes in general is that they are sensitive to errors. If one or more elements of the predicted sequence are lost, the decoder will have a prediction error that may last a long time after the error has occurred. This problem is called error propagation and is a known issue of all predictive coding schemes. One remedy is to force non-predictive coding at regular time intervals, which will terminate the error propagation. This will however have the drawback that the non-predictive encoding may result in a less efficient encoding of the parameter thus increasing the total bit rate of the encoder and/or allowing less bits for encoding of other parameters.

Certain aspects of the disclosure and their embodiments may provide solutions to these or other challenges. Instead of forcing non-predictive coding at regular time intervals for a specific parameter, a method performed in an encoder for selecting a coding mode for a current frame includes obtaining bit rates for absolute coding and predictive coding. The method includes calculating a bit rate difference based on the bit rates obtained. The method includes low-pass filtering the bit rate difference. The method includes selecting a coding mode based on the bit rate difference, the low-pass filtered bit rate difference, and a predictive mode counter.

Various embodiments considers the characteristics of the previous encoding of another parameter such that the forced non-predictive coding for the first parameter is only invoked when it is likely that the encoding of the second parameter will require less bits thereby increasing the likelihood that the total bit consumption will be below a fixed level.

An encoder is adapted to perform operations including obtaining bit rates for absolute coding and predictive coding. The operations include calculating a bit rate difference based on the bit rates obtained. The operations include low-pass filtering the bit rate difference. The operations include selecting a coding mode based on the bit rate difference, the low-pass filtered bit rate difference, and a predictive mode counter.

An encoder (300) having processing circuitry (401) and memory (403) coupled with the processing circuitry, wherein the memory includes instructions that when executed by the processing circuitry causes the encoder (300) to perform operations including obtaining bit rates for absolute coding and predictive coding. The operations include calculating a bit rate difference based on the bit rates obtained. The operations include low-pass filtering the bit rate difference. The operations include selecting a coding mode based on the bit rate difference, the low-pass filtered bit rate difference, and a predictive mode counter.

A computer program having program code to be executed by processing circuitry (401) of an encoder (300) is provided, whereby execution of the program code causes the encoder (300) to perform operations including obtaining bit rates for absolute coding and predictive coding. The operations include calculating a bit rate difference based on the bit rates obtained. The operations include low-pass filtering the bit rate difference. The operations include selecting a coding mode based on the bit rate difference, the low-pass filtered bit rate difference, and a predictive mode counter.

A computer program product comprising a non-transitory storage medium including program code to be executed by processing circuitry (401) of the encoder is provided, whereby execution of the program code causes the encoder to perform operations including obtaining bit rates for absolute coding and predictive coding. The operations include calculating a bit rate difference based on the bit rates obtained. The operations include low-pass filtering the bit rate difference. The operations includes selecting a coding mode based on the bit rate difference, the low-pass filtered bit rate difference, and a predictive mode counter.

Certain embodiments may provide one or more of the following technical advantage(s). The various embodiments can reduce the error propagation problem with predictive coding of one parameter while minimizing the negative impact on the encoding of other parameters.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
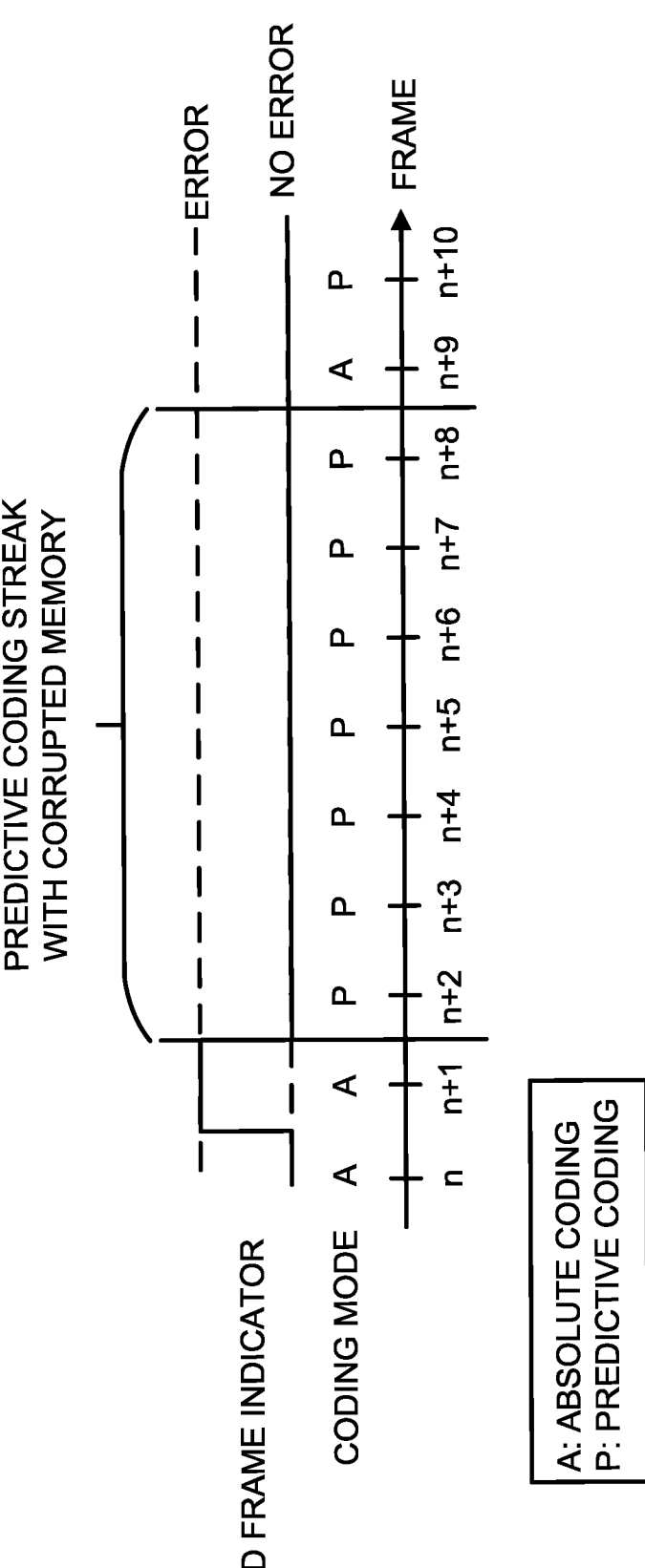
FIG. 1 is an illustration of error propagation.

As previously indicated, one issue with predictive coding schemes is error propagation. An illustration of error propagation is illustrated in FIG. 1. An absolute coding frame is lost before a sequence of consecutive predictive coding frames, which may be referred to as a predictive coding streak. The bad frame indicator signals when a frame is lost (or corrupted). Since the memory is corrupted by the frame loss, the error will last during the entire predictive coding streak (represented by "P") and only terminate when a new absolute coding frame (represented by "A") is received. An effect on the synthesized signal may be an incorrectly perceived location of the source which lasts for the entire predictive coding streak.

Rather than forcing non-predictive coding at regular time intervals for a specific parameter, the various embodiments described herein considers the estimated bit consumption of forcing non-predictive coding at regular time intervals and attempts to seize an opportunity of a lower bit rate consumption by obtaining bit rates for non-predictive (i.e. absolute) coding and predictive coding; calculating a bit rate difference based on the bit rates obtained; low-pass filtering the bit rate difference; and selecting a coding mode based on the bit rate difference, the low-pass filtered bit rate difference, and a predictive mode counter.

According to some of the various embodiments, the characteristics of the previous encoding of another parameter such that the forced non-predictive coding for the first parameter is only invoked when it is likely that the encoding of the second parameter will require less bits thereby increasing the likelihood that the total bit consumption will be below a fixed level.

According to some of the various embodiments, the encoding and decoding includes encoding and decoding a first parameter, wherein the first parameter is encoded based on an interframe and an intraframe prediction and these predictions are combined using a weighting factor α.

Various embodiments reduce the error propagation problem with predictive coding of one parameter while minimizing the negative impact on the encoding of other parameters.

Figure 2:
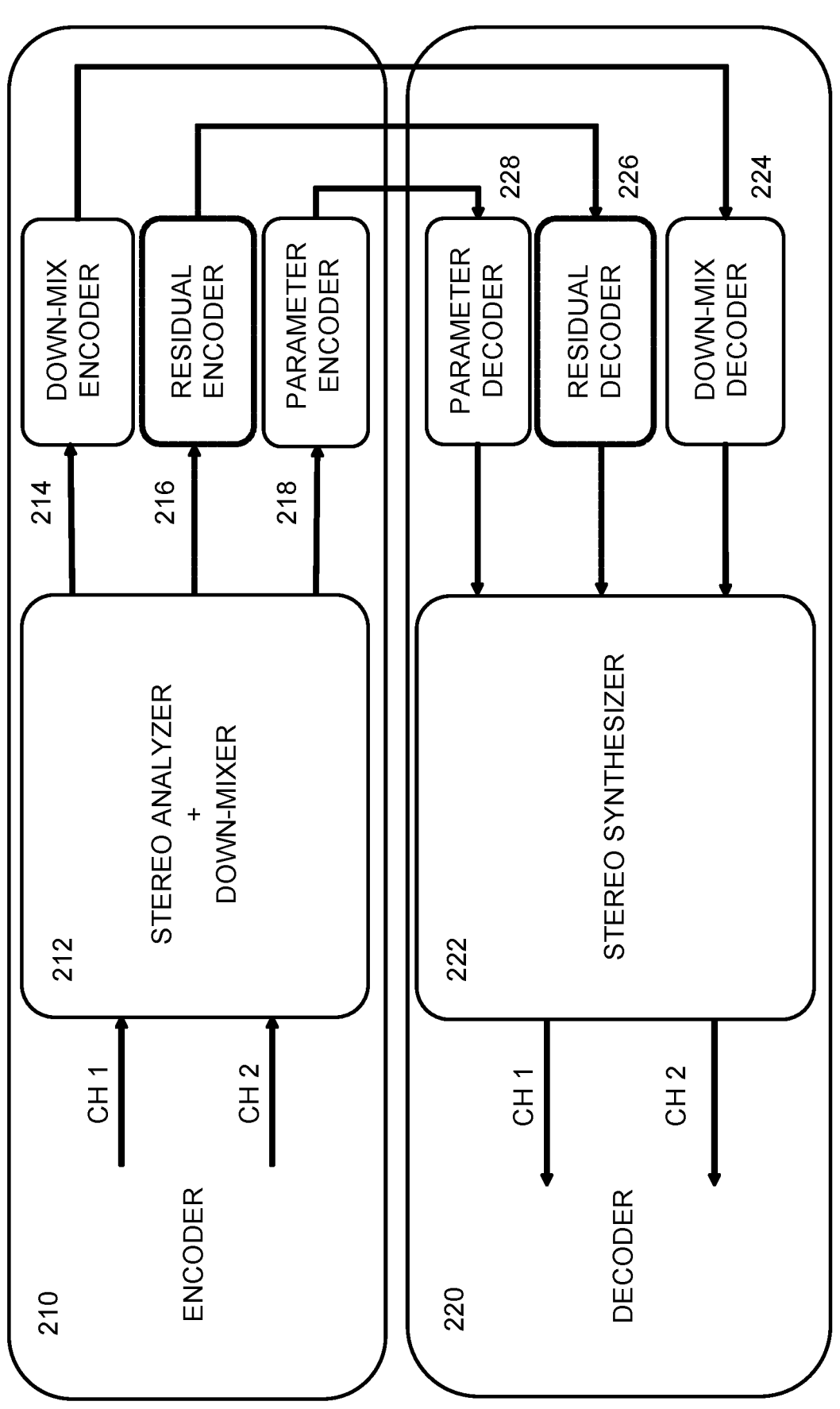
FIG. 2 is a block diagram illustrating components of a stereo encoder and decoder according to some embodiments of the present disclosure.

In the description that follows, the various embodiments operate in the stereo encoder of a stereo encoder and decoder system as outlined in FIG. 2. The stereo encoder 210 processes the input left and right channels in segments referred to as frames. The stereo analysis and down-mix block 212 conducts a parametric analysis and produces a down-mix. For a given frame m the input channels may be written as:

$$\begin{cases} l(m, n) \\ r(m, n) \end{cases}$$

where n=0, 1, 2, . . . , N−1 denotes the sample number in frame m and N is the length of the analysis frame. In various embodiments, the analysis frames are extracted with an overlap in the encoder such that the decoder may reconstruct the stereo signals using an overlap add strategy. The input channels are windowed with a suitable windowing function w (n) and transformed to the Discrete Fourier Transform (DFT) domain and can be written as:

$$\begin{cases} X_L(m, k) = \sum_{n=0}^{N-1} l(m, n)w(n)e^{-\frac{j2\pi kn}{N}} \\ X_R(m, k) = \sum_{n=0}^{N-1} l(m, n)w(n)e^{-\frac{j2\pi kn}{N}} \end{cases}$$

Note that other frequency domain representation may be used here, such as a Quadrature Mirror Filter (QMF) filter bank, a Hybrid QMF filter bank or an odd DFT (ODFT) representation which is composed of the modified discrete cosine transform (MDCT) and modified discrete sine transform (MDST) transform components.

For the parametric analysis, the frequency spectrum is partitioned into bands b, where each band corresponds to a range of frequency coefficients $$k = k_{start(b)}...k_{end(b)}, b = 0, 1, 2, ...N_{bands} - 1$$

where $N_{bands}$ denote the total number of bands. The band limits are typically set to reflect the resolution of the human auditory perception which suggests narrow bands for low frequencies and wider bands for high frequencies. Note that different band resolution may be used for different parameters.

The signals are then analyzed within the parametric analysis block to extract the ITD, IPD and ILD parameters. It may be noted that the ILD has a significant impact on the perceived location of a sound. It is therefore critical to reconstruct the ILD parameter with high accuracy to maintain a stable and correct location.

In addition, the channel coherence may be analyzed, and an ICC parameter may be derived. The set of stereo parameters for frame m may be denoted P (m), which contains the complete set of ITD, IPD, ILD and ICC parameters used in the parametric representation. The parameters are encoded by a parameter encoder 218 and added to the bitstream to be stored or transmitted to a decoder.

Before producing a down-mix channel it may be beneficial to compensate for the ITD and IPD to reduce the cancellation and maximize the energy of the down-mix. The ITD compensation may be implemented both in time domain before the frequency transform or in frequency domain, but it essentially performs a time shift on one or both channels to eliminate the ITD. The phase alignment may be implemented in different ways, but the purpose is to align the phase such that the cancellation is minimized. This ensures maximum energy in the down-mix. The ITD and IPD adjustments may be done in frequency bands or on the full frequency spectrum and it should preferably be done using the quantized ITD and IPD parameters to ensure that the modification can be inverted in the decoder stage.

The embodiments described below are independent of the realization of the IPD and ITD parameter analysis and compensation. In other words, the embodiments are not dependent on how the IPD and ITP are analyzed or compensated. In such embodiments, the ITD and IPD adjusted channels may be denoted with an apostrophe ('):

$$\begin{cases} X'_L(m, k) \\ X'_R(m, k) \end{cases}$$

The ITD and IPD adjusted input channels may then be down-mixed by the parametric analysis and down-mix block 212 to produce a mid/side representation, also called a down-mix/side representation. One way to perform the down-mix is to use the sum and difference of the signals:

$$\begin{cases} X_M(m, k) = \frac{(X'_L(m, k) + X'_R(m, k))}{2} \\ X_S(m, k) = \frac{(X'_L(m, k) + X'_R(m, k))}{2} \end{cases}$$

The down-mix signal $X_M(m,k)$ is encoded by a down-mix encoder 214 to be stored or transmitted to a decoder. This encoding may be done in frequency domain, but it may also be done in time domain. In that case, a DFT synthesis stage is required to produce a time domain version of the down-mix signal, which is in turn fed to the down-mix encoder. The transformation to time domain may however introduce a delay misalignment with the stereo parameters that would require special handling. This can be solved by introducing additional delay or by interpolating the parameters to ensure that the decoder synthesis of the down-mix and the stereo parameters are aligned.

A reconstruction of the side signal $X_S(m,k)$ may be generated from the down-mix and the obtained stereo parameters through a local parametric synthesis. A side signal prediction $X_{\tilde{S}}(m,k)$ can be derived based on the down-mix signal:

7                                                    8

$$X_{\hat{S}}(m, k) = p(X_M(m, k))$$

where p(·) is a predictor function. A prediction residual may be formed according to $$X_{Res}(m, k) = X_S(m, k) - X_{\hat{S}}(m, k)$$

and then encoded by a residual encoder 216. The encoded representations of the down-mix, stereo parameters and potentially a residual signal is transmitted or stored to be reconstructed by a decoder 220. A down-mix decoder 224 reconstructs a decoded down-mix signal, the reconstructed parameters are obtained by the parameter decoder 228 and potentially a reconstructed residual signal is generated by the residual decoder 226. The reconstructed down-mix signal, the reconstructed parameters and the residual signal are input to a stereo synthesizer 222 to produce a reconstructed stereo signal.

Figure 3:
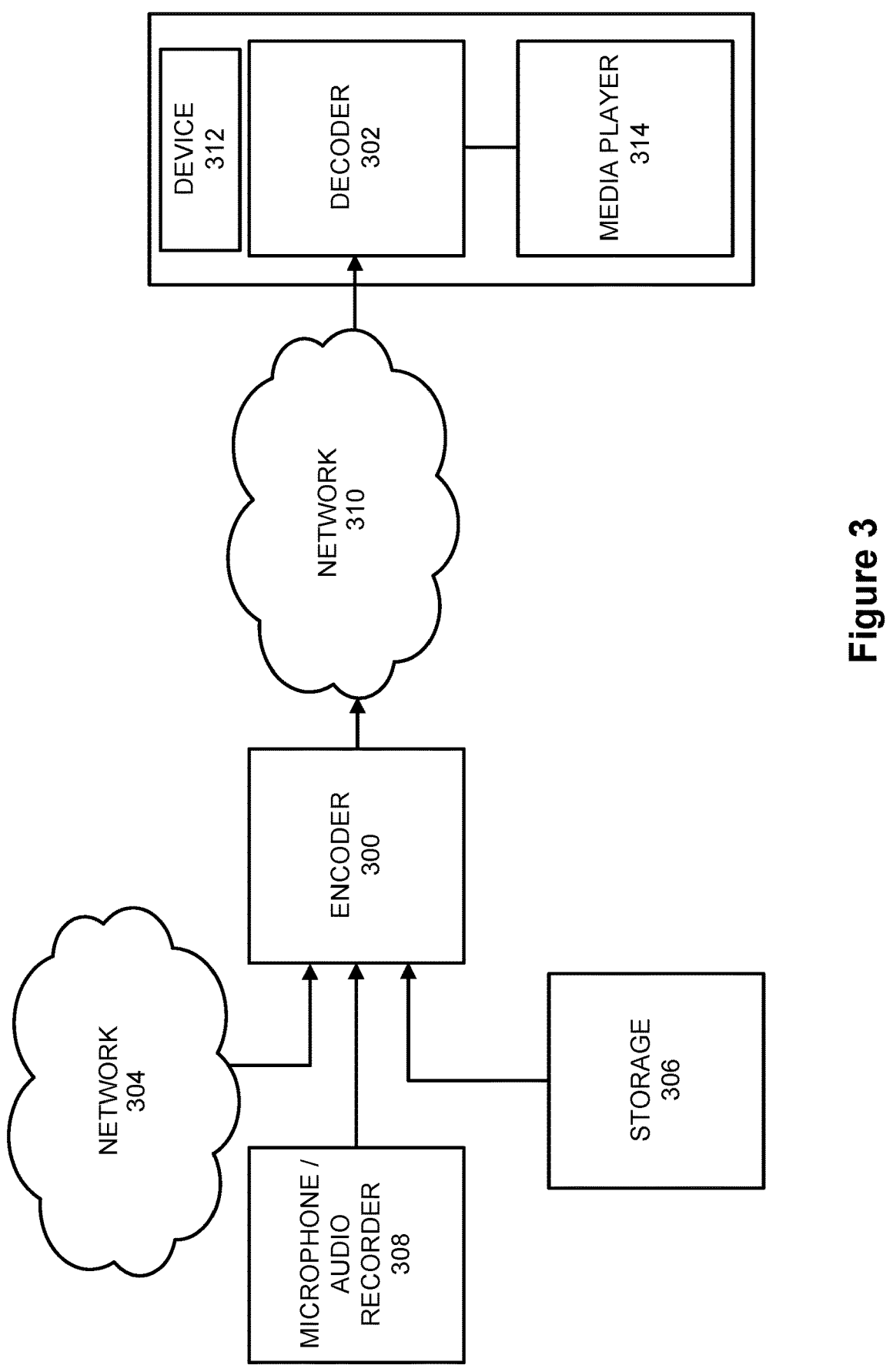
FIG. 3 is a block diagram illustrating an example of an environment of an encoder and decoder system in which a selection of a coding mode may be performed according to some embodiments of the present disclosure.

FIG. 3 illustrates an example of an operating environment of an encoder 300 and a decoder 302 that may be used to encode and decode multichannel bitstreams as described herein. The encoder 300 receives audio from network 304 and/or from storage 306 and/or from an audio recorder 308 and encodes the audio into bitstreams as described below and transmits the encoded audio to decoder 302 via network 310. Storage device 306 may be part of a storage depository of multi-channel audio signals such as a storage repository of a store or a streaming audio service, a separate storage component, a component of a mobile device, etc. The decoder 302 may be part of a device 312 having a media player 314. The device 312 may be a mobile device, a set-top device, a desktop computer, and the like. In other embodiments, the decoder 300 may be embodied in the hardware and/or software of a standalone server, a cloud-implemented server, a distributed server or as processing resources in a server farm. For example, the decoder may be part of a cloud-implemented teleconference application. The decoder 300 receives encoded bitstreams transmitted via a transport layer of a network. During operation, decoder 300 receives and processes the frames of the bitstream as described herein.

Figure 4:
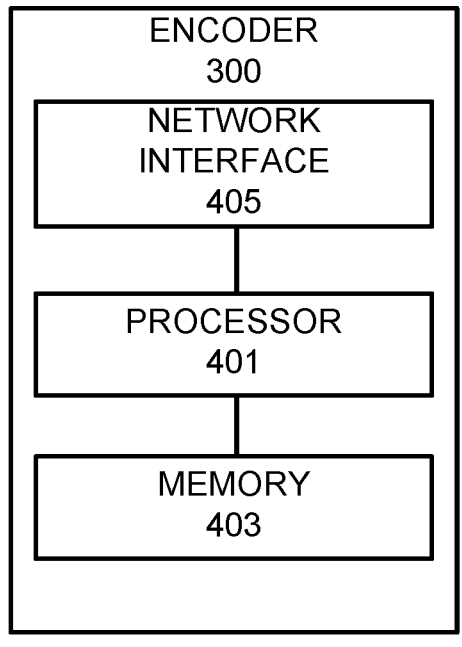
FIG. 4 is a block diagram illustrating components of a stereo encoder according to some embodiments of the present disclosure.

FIG. 4 is a block diagram illustrating elements of encoder 300 configured to encode audio frames according to some embodiments of inventive concepts. As shown, encoder 300 may include a network interface circuitry 405 (also referred to as a network interface) configured to provide communications with other devices/entities/functions/etc. The encoder 300 may also include processor circuitry 401 (also referred to as a processor) coupled to the network interface circuitry 405, and a memory circuitry 403 (also referred to as memory) coupled to the processor circuit. The memory circuitry 403 may include computer readable program code that when executed by the processor circuitry 401 causes the processor circuit to perform operations according to embodiments disclosed herein.

According to other embodiments, processor circuitry 401 may be defined to include memory so that a separate memory circuit is not required. As discussed herein, operations of the encoder 300 may be performed by processor 401 and/or network interface 405. For example, processor 401 may control network interface 405 to transmit communications to decoder 302 and/or to receive communications through network interface 405 from one or more other network nodes/entities/servers such as other encoder nodes, depository servers, etc. Moreover, modules may be stored in memory 403, and these modules may provide instructions so that when instructions of a module are executed by processor 401, processor 401 performs respective operations.

Figure 5:
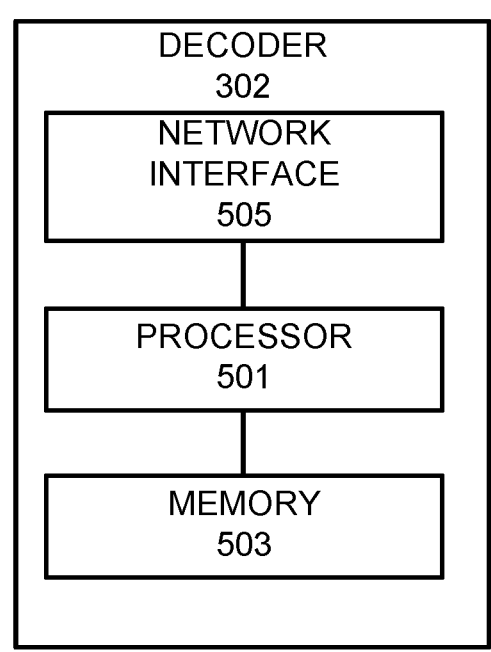
FIG. 5 is a block diagram illustrating components of a stereo decoder according to some embodiments of the present disclosure.

FIG. 5 is a block diagram illustrating elements of decoder 302 configured to encode audio frames according to some embodiments of inventive concepts. As shown, decoder 302 may include a network interface circuitry 505 (also referred to as a network interface) configured to provide communications with other devices/entities/functions/etc. The decoder 302 may also include processor circuitry 501 (also referred to as a processor) coupled to the network interface circuitry 505, and a memory circuitry 503 (also referred to as memory) coupled to the processor circuit. The memory circuitry 503 may include computer readable program code that when executed by the processor circuitry 501 causes the processor circuit to perform operations according to embodiments disclosed herein.

According to other embodiments, processor circuitry 501 may be defined to include memory so that a separate memory circuit is not required. As discussed herein, operations of the decoder 302 may be performed by processor 501 and/or network interface 505. For example, processor 501 may control network interface 505 to transmit communications to decoder 302 and/or to receive communications through network interface 505 from one or more other network nodes/entities/servers such as other encoder nodes, depository servers, etc. Moreover, modules may be stored in memory 503, and these modules may provide instructions so that when instructions of a module are executed by processor 501, processor 501 performs respective operations.

Figure 6:
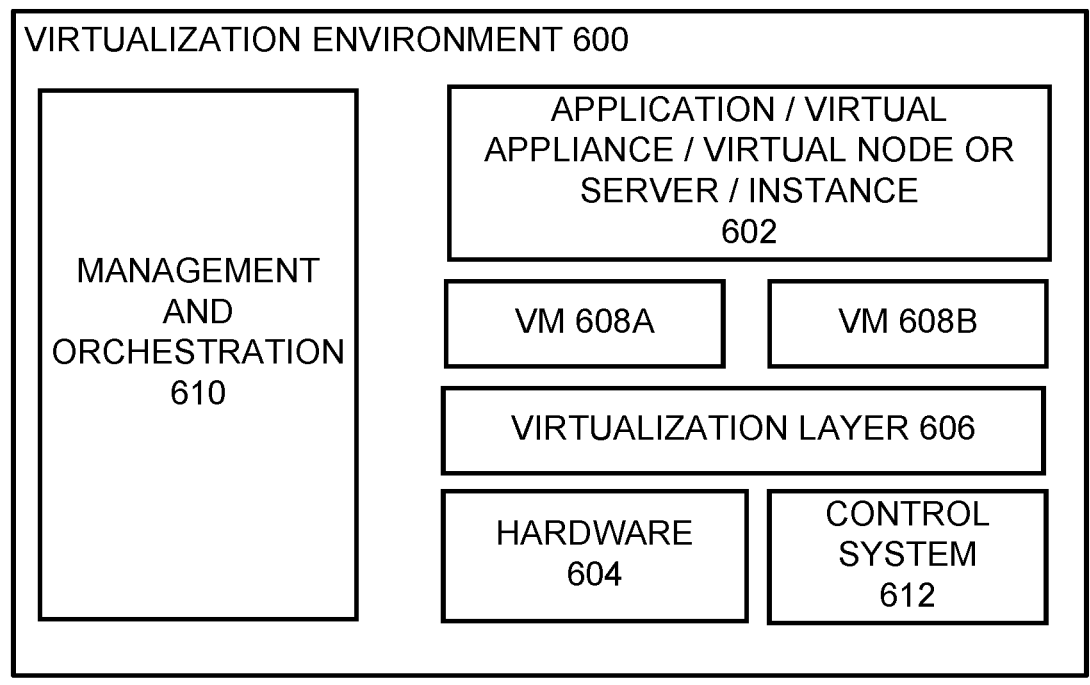
FIG. 6 is a block diagram of a virtualization environment in accordance with some embodiments of the present disclosure.

FIG. 6 is a block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 600 hosted by one or more of hardware nodes, such as a hardware computing device that operates as a network node, user equipment (UE), core network node, or host. Further, in embodiments in which the virtual node does not require radio connectivity (e.g., a core network node or host), then the node may be entirely virtualized.

Applications 602 (which may alternatively be called software instances, virtual appliances, network functions, virtual nodes, virtual network functions, etc.) are run in the virtualization environment 600 to implement some of the features, functions, and/or benefits of some of the embodiments disclosed herein.

Hardware 604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 606 (also referred to as hypervisors or virtual machine monitors (VMMs)), provide VMs 608A and 608B (one or more of which may be generally referred to as VMs 608), and/or perform any of the functions, features and/or benefits described in relation with some embodiments described herein. The virtualization layer 606 may present a virtual operating platform that appears like networking hardware to the VMs 608.

The VMs 608 comprise virtual processing, virtual memory, virtual networking or interface and virtual storage, and may be run by a corresponding virtualization layer 606. Different embodiments of the instance of a virtual appliance 602 may be implemented on one or more of VMs 608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 608 may be a software implementation of a physical machine that runs programs as if they were executing on a physical, non-virtualized machine. Each of the VMs 608, and that part of hardware 604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 608 on top of the hardware 604 and corresponds to the application 602.

Hardware 604 may be implemented in a standalone network node with generic or specific components. Hardware 604 may implement some functions via virtualization. Alternatively, hardware 604 may be part of a larger cluster of hardware (e.g. such as in a data center or a customer premises equipment (CPE)) where many hardware nodes work together and are managed via management and orchestration 610, which, among others, oversees lifecycle management of applications 602. In some embodiments, hardware 604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 612 which may alternatively be used for communication between hardware nodes and radio units.

Returning to the parameter encoder 218, the side signal predictor may be implemented as a single prediction factor g which minimizes the mean squared error (MSE) between the side signal and the predicted side signal. Further, the prediction would preferably be applied on frequency bands, and involve a prediction parameter for each frequency band b.

$$X_{\tilde{S}}(m, k) = g_b X_M(m, k), k = k_{start(b)} \dots k_{end(b)}$$

If the coefficients of band b are written as column vectors $X_{S,b}(m)$ and $X_{M,b}(m)$, the minimum MSE predictor can be derived as $$g_b(m) = \frac{X_{M,b}(m)^T X_{S,b}(m)}{X_{M,b}(m)^T X_{M,b}(m)}$$

However, this expression may be simplified to produce a more stable prediction parameter. Although the prediction parameter $g_b(m)$ does not directly represent a level difference, it may control the portion of the down-mix signal which is routed to the left and right channels. Hence, as for the ILD parameter, it has a significant impact on the perceived sound location. For more background on the prediction parameter, please refer to PCT application number PCT/EP2019/058650 (publication number WO2019/193156). The prediction parameter $g_b(m)$ is in turn encoded using an inter-frame predictive coding scheme, where differences between the frames m are considered. For each band b a difference from the reconstructed parameters $\hat{g}_b(m)$ of the previous frame is calculated according to $$\Delta g_b(m) = g_b(m) - \hat{g}_b(m-1)$$

The encoder 300 may choose to encode either $g_b(m)$ or $\Delta g_b(m)$, depending on which of them yields the lowest bit consumption. In an embodiment, $g_b(m)$ and $\Delta g_b(m)$ may be quantized using a scalar quantizer followed by an entropy coder on the quantizer indices. Arithmetic coding, Huffman coding and Golomb-Rice coding are examples which may be used as an entropy coder. In a typical scenario, the entropy coder would assign smaller code words to small variations, i.e. small values of $\Delta g_b(m)$. This means that the predictive coding using $\Delta g_b(m)$ is likely to require a low number of bits $nbits_{pred}(m)$ for stable audio scenes. For fast scene changes, resulting in large $\Delta g_b(m)$, the bit consumption $nbits_{abs}(m)$ for the encoding of $g_b(m)$ may be lower. The encoding scheme would have two modes, which are:

1) ABSOLUTE: encoding of $g_b(m)$, and
2) PREDICTIVE: encoding of $\Delta g_b(m)$ The encoding mode $g_{mode}(m) \in \{\text{ABSOLUTE, PREDICTIVE}\}$ would need to be encoded for each frame m, such that the decoder 302 knows if the encoded value is 1) ABSOLUTE: $g_b(m)$, or
2) PREDICTIVE: $\Delta g_b(m)$.

Further variations of this encoding scheme are possible within the scope of this disclosure. For instance, if the prediction parameter $g_b(m)$ shows high correlation with another parameter, such as the residual coding energy or a corresponding representation, it may be beneficial to encode those parameters jointly. The essential part is that the encoding scheme has a predictive mode and an absolute coding mode, and that this decision is encoded and signaled to the decoder. A sequence of consecutive PREDICTIVE coding modes may be referred to as a "predictive coding streak" or "predictive streak" and would normally be observed for audio segments where the scene is stable. If an audio frame in the onset of the predictive streak is lost, the parameters may suffer from error propagation during the entire streak (see the illustration in FIG. 1).

It is also possible that the ABSOLUTE and PREDICTIVE coding modes each represent a subset of modes with the common property that they are absolute or predictive coding modes respectively. For instance, an absolute coding mode could rely on intra-frame prediction, entropy coding of parameters or simply represent an enumeration of the possible parameters with a fixed-width index. For the subset of predictive coding modes, they would all rely on parameters that have been previously encoded and decoded.

To reduce the effect of error propagation in the decoding of $g_b(m)$ to form the reconstructed counterpart $\hat{g}_b(m)$ when experiencing packet loss between the encoder and the decoder, ABSOLUTE coding may be forced at regular intervals which effectively limits the predictive streak to a maximum length in time. This may however lead to a less efficient encoding of $g_b(m)$ for the frames where ABSOLUTE coding is forced. This encoding scheme may be implemented according to $$g_{mode}(m) =$$
$$\begin{cases} \text{PREDICTIVE}, & \text{pred\_allowed}(m) \text{ AND } nbits_{pred}(m) < nbits_{abs}(m) \\ \text{ABSOLUTE}, & \text{otherwise} \end{cases}$$

where pred_allowed(m) is an optional flag representing if predictive coding is allowed. The pred_allowed(m) is at least based on the number of frames since the last ABSOLUTE coded frame, such that the PREDICTIVE mode is disabled when a maximum number of predictive frames have been reached, e.g.

$$\text{pred\_allowed}(m) =$$
$$\begin{cases} \text{TRUE}, & \text{predcount}(m-1) < \text{MAX\_PRED\_STREAK} \\ \text{FALSE}, & \text{otherwise} \end{cases}$$

where predcount(m) is the number of frames since the last ABSOLUTE coded frame. An optional embodiment of the predallowed(m) can be obtained according to:

$$\text{pred\_allowed}(m) =$$
$$\begin{cases} \text{TRUE}, & \text{predcount}(m-1) \le \text{MAX\_PRED\_STREAK\_M1} \\ \text{FALSE}, & \text{otherwise} \end{cases}$$

or $$\text{pred\_allowed}(m) =$$
$$\begin{cases} \text{TRUE}, & \text{predcount}(m-1) = \text{MAX\_PRED\_STREAK\_M1} \\ \text{FALSE}, & \text{otherwise} \end{cases}$$

where the use of 'S' or '=' would make the effective predictive streak equal to MAX_PRED_STREAK_M1+1, or in other words:

$$\text{MAX\_PRED\_STREAK} = \text{MAX\_PRED\_STREAK\_M1} + 1$$

The pred_allowed(m) may be further amended to reflect situations where predictive mode should be allowed or disallowed, e.g. after a switch of a coding mode or in other cases where the predictive streak should be broken.

The predcount(m) variable may be initialized to zero at startup and later updated according to $$\text{predcount}(m) = \begin{cases} 0, & g_{mode}(m) = \text{ABSOLUTE} \\ \text{predcount}(m-1) + 1, & g_{mode}(m) = \text{PREDICTIVE} \end{cases}$$

Note that since predcount(m) depends on $g_{mode}(m)$ of the current frame m, the pred_allowed(m) would typically be based on the predcount(m−1) from the previous frame m−1. This would need to be accounted for in the MAX_PRED_STREAK constant such that the desired number of frames in the predictive streak is achieved. A typical value for MAX_PRED_STREAK may be MAX_PRED_STREAK=10, which corresponds to 200 ms in case of 20 ms frame steps. In case of comfort noise generation, the frame rate may be decreased and frames may be transmitted e.g. every 160 ms, corresponding to every 8th frame in the coding of active signals. In such cases predcount(m) may be updated with a larger step to have a similar recovery time during comfort noise. For example, predcount(m) may be updated with a larger step according to $$\text{predcount}(m) = \begin{cases} 0, & g_{mode}(m) = \text{ABSOLUTE} \\ \text{predcount}(m-1) + \text{step}(m), & g_{mode}(m) = \text{PREDICTIVE} \end{cases}$$
$$\text{step}(m) = \begin{cases} 1, & \text{active frame} \\ 8, & \text{SIDframe} \end{cases}$$

A drawback with the mode selection described above, is that when the absolute coding is forced the cost for selecting absolute coding over predictive coding may be large when the MAX_PRED_STREAK is reached.

Figure 7:
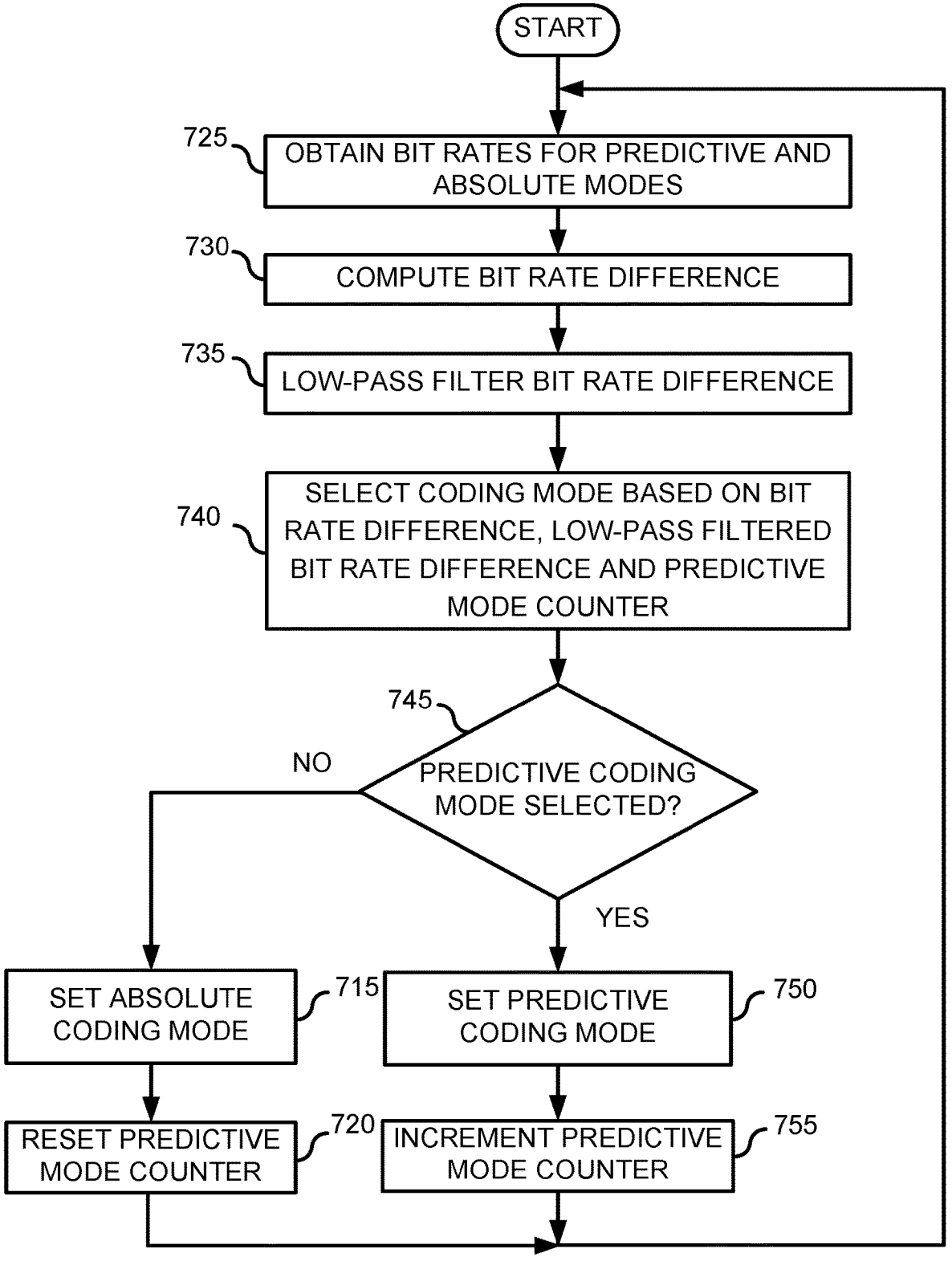
FIG. 7 is a flow chart illustrating operations of an encoder according to some embodiments of the present disclosure.

Operations of the encoder 300 (implemented using the structure of the block diagram of FIGS. 4 and 8) will now be discussed with reference to the flow chart of FIG. 7 according to some embodiments of the present disclosure. For example, modules may be stored in memory 403 of FIG. 4, and these modules may provide instructions so that when the instructions of a module are executed by respective encoder processing circuitry 401, encoder 300 performs respective operations of the flow chart.

Figure 8:
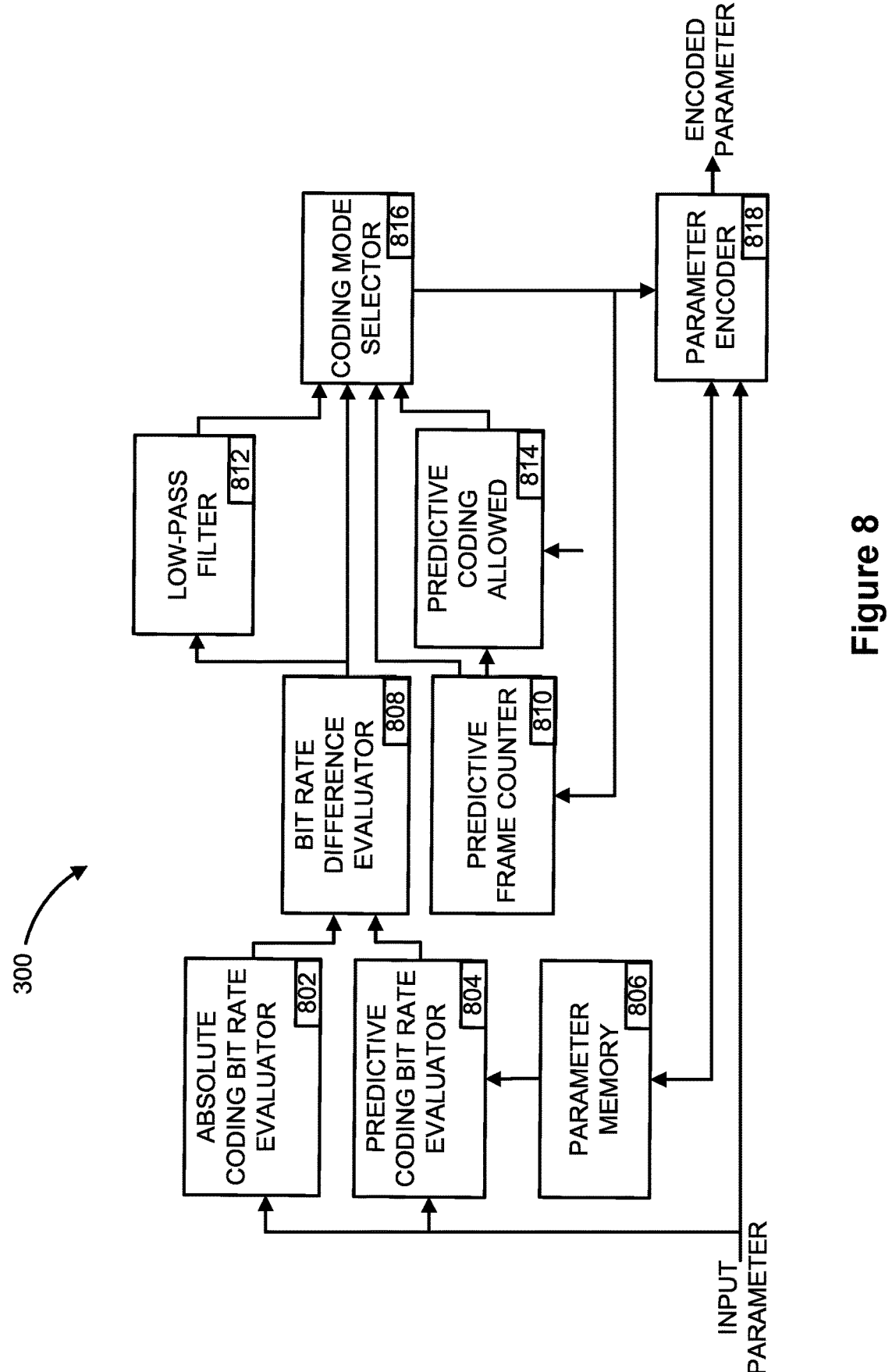
FIG. 8 is a block diagram illustrating further components of the encoder of FIG. 4 that perform operations illustrated in FIG. 8 according to some embodiments of the present disclosure.

The decision of which coding mode (i.e., $g_{mode}(m)$) to select is based on an estimated average difference between $nbits_{abs}(m)$ and $nbits_{pred}(m)$. In FIG. 8, blocks 802 and 804 perform block 725 to obtain the bit rates for absolute coding $nbits_{abs}(m)$ and predictive coding $nbits_{pred}(m)$. The calculation of $nbits_{pred}(m)$ is based on the parameter memory 806. When computing $nbits_{abs}(m)$, more than one absolute coding mode may be considered, and the $nbits_{abs}(m)$ should be set to the minimum of these absolute coding modes. For instance, an entropy coding method may in some cases result in a bit rate larger than directly encoding the indices in binary format. In this case it is preferable to select the direct index encoding as a fallback solution.

In block 730, the encoder 300 calculates a bit rate difference based on the obtained bit rates. In FIG. 8, block 808 computes the bit rate difference bitdiff(m). In some embodiments, the bit rate difference is calculated according to $$bitdiff(m) = nbits_{abs}(m) - nbits_{pred}(m)$$

In block 735, the encoder 300 low pass filters the bit rate difference. In FIG. 8, block 812 performs the low-pass filtering. In some embodiments, the encoder 300 low-pass filters the bit rate difference according to $$bitdiff_{LP}(m) = \gamma bitdiff(m) + (1 - \gamma)bitdiff_{LP}(m-1)$$

where γ is a low-pass filter coefficient for which a suitable value may be γ=0.06 or in the range γ∈[0.01, 0.20].

Note that if the bit difference is constant (e.g., bitdiff(m)=constant D), the average cost of the regularly forced absolute coding at the interval of MAX_

PRED_STREAK will be D/MAX_PRED_STREAK. If one wants to seize the opportunity to code an absolute frame after predcount(m) frames, this should yield a lower or equal cost, i.e.

$$bitdiff(m)/predcount(m-1) \leq D/\text{MAX\_PRED\_STREAK}$$

Equivalently, this may be expressed as a condition to select a predictive mode only when the cost of the absolute coding is strictly larger than the estimated cost at the regularly forced interval, i.e.

$$bitdiff(m)/predcount(m-1) > D/\text{MAX\_PRED\_STREAK}$$

In some embodiments, the constant D can be approximated using the low-pass filtered bit rate difference $bitdiff_{LP}$ (m), the equation becomes $$bitdiff(m) > bitdiff_{LP}(m) \cdot predcount(m-1)/\text{MAX\_PRED\_STREAK}$$

Figure 9:
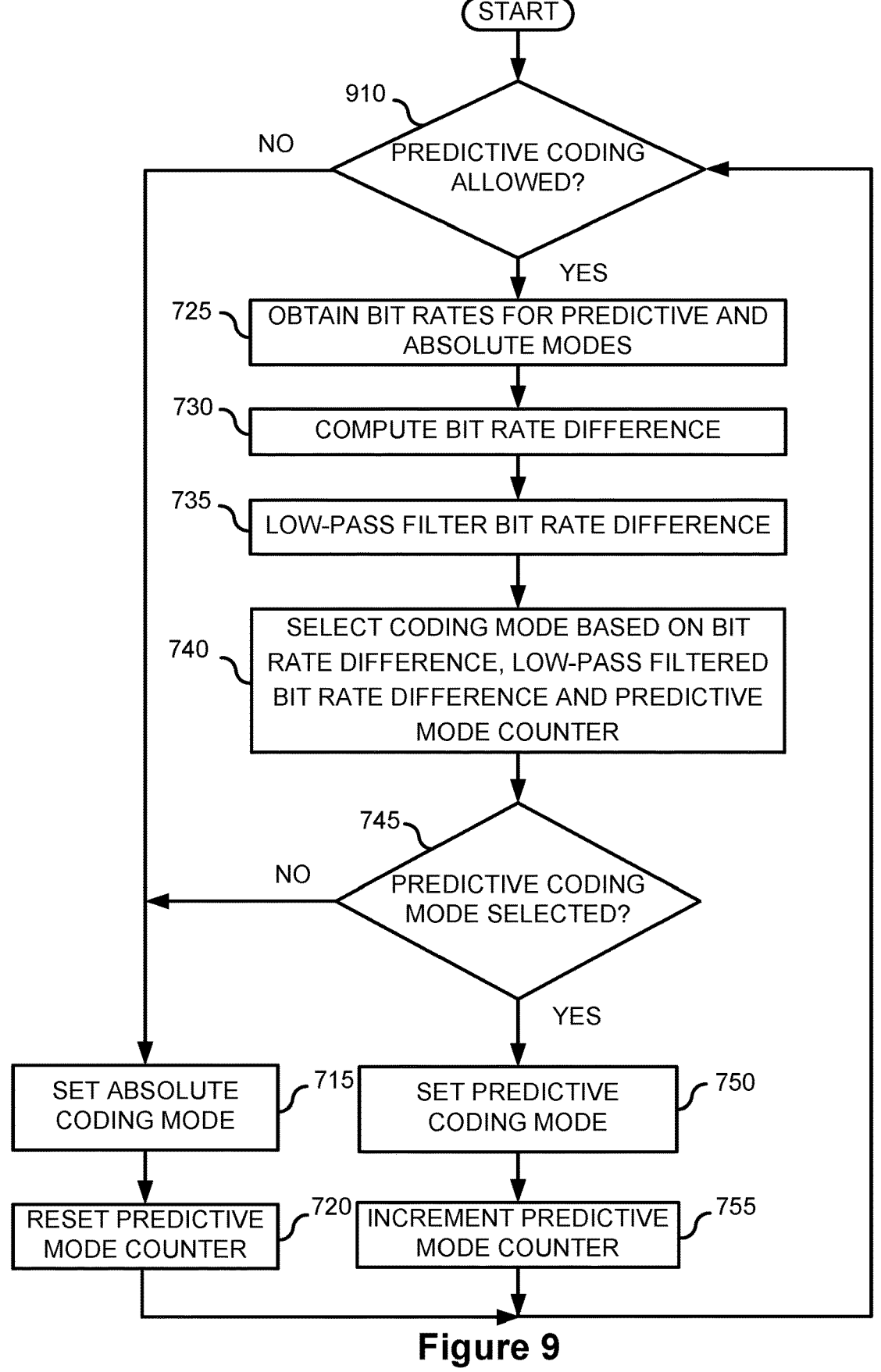
FIGS. 9-10 are flow charts illustrating operations of an encoder according to some embodiments of the present disclosure.

This corresponds to the decision threshold as illustrated in FIG. 9. If a more conservative approach is desired, a tuning constant C may be added. For example, the tuning constant C can be utilized with the constant D in accordance with $$bitdiff(m) > C \cdot bitdiff_{LP}(m) \cdot predcount(m-1)/\text{MAX\_PRED\_STREAK}$$

with $C \in [0,1]$. Note that C=0 gives the original behavior of only selecting absolute coding when the required bits is lower or equal to predictive coding, $bits_{abs}(m) \leq bit_{diff}(m)$, or equivalently, selecting predictive coding when $bits_{abs}(m) > bits_{diff}(m)$. While C=1 gives the theoretical optimum for a constant $bitdiff_{LP}(m)=D$, a slightly more conservative approach for realistically varying $bitdiff_{LP}(m)$ may be found by setting to C=0.8. Note that depending on how pred_allowed(m) is calculated, the expression may be written according to:

$$bitdiff(m) >$$
$$C \cdot bitdiff_{LP}(m) \cdot predcount(m-1)/(\text{MAX\_PRED\_STREAK\_M1} + 1)$$

In block 740, the encoder 300 selects a coding mode based on the bit rate difference, the low-pass filtered bit rate difference, and a predictive mode counter. In some embodiments, the selecting of the coding mode is based on combining the expression with the tuning constant C with the $g_{mode}(m)$ selection by the coding mode selector 816 in accordance with $$g_{mode}(m) = \begin{cases} \text{PREDICTIVE}, & \text{pred\_allowed}(m) \text{ AND } predcond(m) \\ \text{ABSOLUTE}, & \text{otherwise} \end{cases}$$

$$predcond(m) = bitdiff(m) > C \cdot bitdiff_{LP}(m) \cdot \frac{predcount(m-1)}{\text{MAX\_PRED\_STREAK}}$$

If the pred_allowed(m) flag is not present, the expression may be written according to $$g_{mode}(m) = \begin{cases} \text{PREDICTIVE}, & predcond(m) \\ \text{ABSOLUTE}, & \text{otherwise} \end{cases}$$

$$predcond(m) = bitdiff(m) > C \cdot bitdiff_{LP}(m) \cdot \frac{predcount(m-1)}{\text{MAX\_PRED\_STREAK}}$$

Another embodiment which tries to consider possible options for absolute coding before the MAX_PRED_STREAK may be realized according to $$g_{mode}(m) = \begin{cases} \text{PREDICTIVE}, & \text{pred\_allowed}(m) \text{ AND } nbits_{pred}(m) < \\ & nbits_{abs}(m) - A \cdot predcount(m-1) \\ \text{ABSOLUTE}, & \text{otherwise} \end{cases}$$

where A is a constant, e.g. A=0.4 or in the range $A \in (0, 2]$. This way the predictive streak is kept within the limit MAX_PRED_STREAK while still allowing the coding mode to be switched to an ABSOLUTE mode before the limit is reached, if the cost $(nbits_{abs}(m)-nbits_{pred}(m))$ is found to be low enough. This can be seen as an increasing urgency to select an absolute coding mode as the number of frames since the last absolute coding mode increases. By setting the constant A appropriately, it may be possible to reduce both the average bit rate and the average length of the predictive streak, given a certain type of material and comparing to the forced absolute coding after MAX_PRED_STREAK frames.

If predictive mode is selected by the encoder 300 as represented by block 745, the encoder 300 sets the coding mode to be the predictive mode in block 750 and increments the predictive mode counter (e.g., predcount(m)) in block 755. In FIG. 8, the parameter encoder 818 sets the coding mode to be the predictive mode in block 750. The predictive frame counter block 810 performs the incrementing of the predictive mode counter.

If predictive mode is not selected by the encoder 300 as represented by block 745, the encoder 300 sets the coding mode to be the absolute coding mode in block 715 and resets (or sets) the predictive mode counter to an initial value (e.g., predcount(m)) to an initial value in block 720. The initial value may be 0, 1, or any other value. In FIG. 8, the parameter encoder 818 sets the coding mode to be the absolute mode in block 750. The predictive frame counter block 810 performs the resetting/setting of the predictive mode counter.

In some other embodiments, predictive coding may not be allowed for certain frames. Thus, in these embodiments, the encoder 300 determines whether predictive coding is allowed. This is illustrated in FIG. 9.

Turning to FIG. 9, blocks 715-755 are described above in FIG. 7 and shall not be repeated here. In block 910, the encoder 300 determines if predictive coding is allowed. One way to determine this is by checking the pred_allowed(m) indicator. As explained above, the pred_allowed(m) indicator is based on the predictive mode counter predcount(m) (e.g., predcount(m−1)). The determining is performed in block 814 of FIG. 8. As described above, in some embodiments, predictive coding is allowed when predcount(m−1) is less than the maximum number of predictive frames allowed. In other words, the predictive coding is not allowed when predcount(m−1) is greater than the maximum number of predictive frames allowed. In other embodiments, the predictive coding is not allowed when predcount(m−1) is greater than or equal to the maximum number of predictive frames allowed. In other embodiments, predictive coding is allowed when predcount(m−1) is smaller or equal to the maximum number of predictive frames allowed. Since predcount(m) increases by one per frame, the condition may be evaluated by checking if predcount(m−1) is equal to the maximum number of predictive frames allowed.

Figure 10:
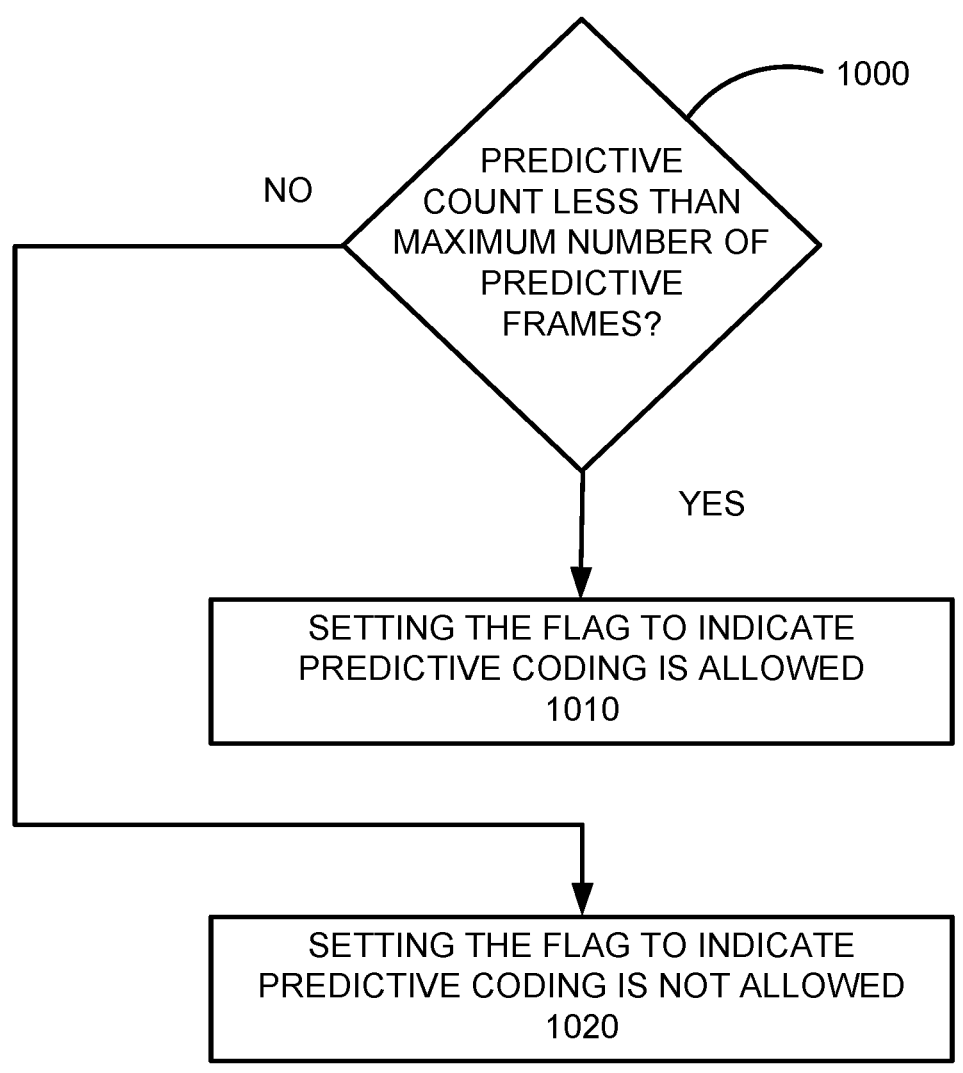
Figure 11:
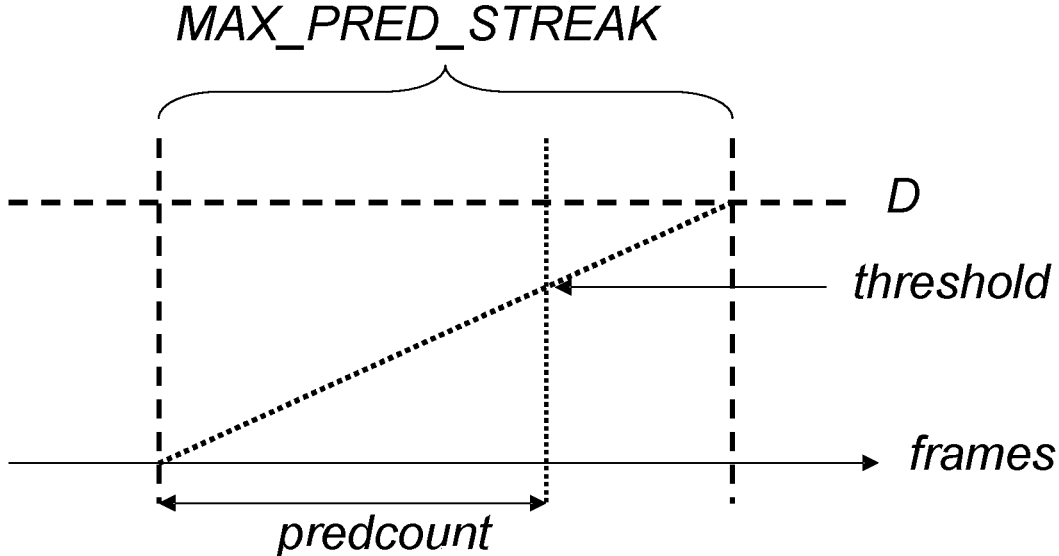
FIG. 11 is an illustration of a decision threshold according to some embodiments of the present disclosure.

In some embodiments the pred_allowed(m) indicator is a flag. FIG. 10 illustrates an embodiment of setting the flag. Turning to FIG. 10, in block 1000, the encoder 300 determines if a predictive count is below a maximum number of predictive frames. Responsive to determining that the predictive count is less than the maximum number of predictive frames, the method includes setting the flag to indicate predictive coding is allowed in block 1010. Responsive to determining that the predictive count is greater than the maximum number of predictive frames, the method includes setting the flag to indicate predictive coding is note allowed in block 1020. When the predictive count is equal to the maximum number of predictive frames, the default can be to set the flag to indicate that predictive coding is allowed or to indicate that predictive coding is not allowed. Other settings can be used to set the flag and are described in the embodiments herein when pred_allowed(m) is TRUE.

Returning to FIG. 9, responsive to the predictive coding not being allowed, the encoder 300 sets the coding mode to be an absolute coding mode in block 715 and sets or resets the predictive mode counter to zero in block 720 as previously described.

In another embodiment, the selection between ABSOLUTE and PREDICTIVE decoding mode may be influenced by encoding of second parameter of the codec. Instead of just counting frames, the choice may be tied to the potential error recovery of the second parameter. Assume the second parameter $C(m)$ is encoded using a combined prediction including an intra-frame prediction $C_{intra}(m)$, an inter-frame prediction $C_{inter}(m)$ and an encoded prediction residual $r(m)$. Let the reconstructed parameter $\hat{C}(m)$ be formed based on the reconstructed intra-frame prediction $\hat{C}_{intra}(m)$, the reconstructed inter-frame prediction $\hat{C}_{inter}(m)$ and the reconstructed prediction residual $\hat{r}(m)$. For example, the reconstructed parameter $C(m)$ can be determined in some embodiments in accordance with $$\hat{C}(m) = \alpha(m)\hat{C}_{intra}(m) + (1 - \alpha(m))\hat{C}_{inter}(m) + \hat{r}(m)$$

The weighting parameter $\alpha(m)$ controls the proportion of intra-frame prediction, which can be seen as absolute coding, versus the proportion of inter-frame prediction, which depends on the past frames. Since the parameter typically is stable, the weight $\alpha(m)$ balances the fast error recovery (large $\alpha(m)$) versus low bit rate in the residual coding (small $\alpha(m)$). If a transmission error occurs the memory of the decoder will be out of synchronization with the encoder. This can be modeled as an error $\varepsilon$ in the inter-frame prediction term in accordance with $$\hat{C}_{\varepsilon}(m) = \alpha(m)\hat{C}_{intra}(m) + (1 - \alpha(m))\left(\hat{C}_{inter}(m) + \varepsilon\right) + \hat{r}(m)$$

Subtracting the error free decoding leads to:

$$\hat{C}_{\varepsilon}(m) - \hat{C}(m) = (1 - \alpha(m))\varepsilon$$

If a transmission error occurs in frame m, the residual error $\varepsilon_{res}$ after M frames can be expressed as $$\varepsilon_{res}(M) = \varepsilon \prod_{k=m+1}^{m+M} (1 - \alpha_k)$$

This can be expressed as a relative error:

$$\varepsilon_{rel}(M) = \frac{\varepsilon_{res}(M)}{\varepsilon} = \prod_{k=m+1}^{m+M} (1 - \alpha_k)$$

Using a recursive definition, this can be expressed as:

$$\varepsilon_{rel}(m) = \begin{cases} 1, & g_{mode}(m) = \text{ABSOLUTE} \\ \alpha(m)\varepsilon_{rel}(m-1), & g_{mode}(m) = \text{PREDICTIVE} \end{cases}$$

Note that a sequence of $\alpha(m)$ close to 1, meaning a high weight for the intra-frame prediction, will make the relative error fall quickly towards zero. For $\alpha(m)$ closer to zero, the weight for the inter-frame prediction from past frames will be larger and the relative error will decrease at a lower rate. Equivalently, one can define a recovery parameter as $R(M)=(1-\varepsilon_{rel}(M))$. It may also be calculated according to $$R(M) = \begin{cases} 0, & M = 0 \\ \alpha(M) + (1 - \alpha(M))R(M-1), & M > 0 \end{cases}$$

By analyzing the error recovery rate of the coherence parameter, an absolute coding of the side prediction parameter $g_b(m)$ can be triggered such that the error resilience of the first and second parameters is balanced. One way to implement this is to influence the pred_allowed(m) according to $$\text{pred\_allowed}(m) = \begin{cases} \text{TRUE}, & \varepsilon_{rel}(m-1) > \varepsilon_{THR} \\ \text{FALSE}, & \text{otherwise} \end{cases}$$

where $\varepsilon_{THR}$ is a threshold value for the relative error. With a setting of e.g. $\varepsilon_{THR}=0.01$, prediction will be disallowed one the potential relative error has decreased below 1 percent. Note that the pred_allowed(m) needs to depend on the relative error of the previous frame m−1 since the updated $\varepsilon_{rel}(m)$ depends on the mode selection of the current frame m. Further combinations are possible, e.g. using both a frame counter and a recovery analysis according to pred_allowed($m$) =

$$\begin{cases} \text{TRUE}, & \varepsilon_{rel}(m-1) > \varepsilon_{THR} \text{ AND } predcount(m-1) < \text{MAX\_PRED\_STREAK} \\ \text{FALSE}, & \text{otherwise} \end{cases}$$

Note that the mode selection could be further adapted to use $\varepsilon_{rel}(m-1)$, which can be adapted to be $$g_{mode}(m) = \begin{cases} \text{PREDICTIVE}, & \text{pred\_allowed}(m) \text{ AND } nbits_{pred}(m) < nbits_{abs}(m) - B/\varepsilon_{rel}(m-1) \\ \text{ABSOLUTE}, & \text{otherwise} \end{cases}$$

where B is a constant.

An alternative to computing the relative error $\varepsilon_{rel}(m)$ is to accumulate the $\alpha(m)$ weighting factors:

$$\alpha_{acc}(m) = \begin{cases} 0, & g_{mode}(m) = \text{ABSOLUTE} \\ \alpha(m) + \alpha_{acc}(m-1), & g_{mode}(m) = \text{PREDICTIVE} \end{cases}$$

Similarly, the $\alpha_{acc}(m)$ may be used either to influence the pred_allowed(m) according to pred_allowed($m$) =

$$\begin{cases} \text{TRUE}, & \varepsilon_{rel}(m-1) > \varepsilon_{THR} \text{ AND } \alpha_{acc}(m-1) < \alpha_{acc,max} \\ \text{FALSE}, & \text{otherwise} \end{cases}$$

where $\alpha_{acc,max}$ is a constant corresponding to a level of error recovery, or to influence the mode selection according to $$g_{mode}(m) = \begin{cases} \text{PREDICTIVE}, & \text{pred\_allowed}(m) \text{ AND } nbits_{pred}(m) < nbits_{abs}(m) - G\alpha_{acc}(m-1) \\ \text{ABSOLUTE}, & \text{otherwise} \end{cases}$$

where G is a constant that gives a suitable bit margin given the input material to be encoded and the observed $\alpha(m)$ values for the material.

In the above-description of various embodiments, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed in an encoder for selecting a coding mode for a current frame, the method comprising:
    obtaining bit rates for absolute coding and predictive coding;
    calculating a bit rate difference based on the bit rates for absolute coding and predictive coding;
    low-pass filtering the bit rate difference according to $bitdiff_{LP}(m)=\gamma bitdiff(m)+(1-\gamma) bitdiff_{LP}(m-1)$, where $\gamma$ is a low-pass filter coefficient; and
    selecting a coding mode based on the bit rate difference, the low-pass filtered bit rate difference, and a predictive mode counter.

2. The method of claim 1, further comprising:
    responsive to selecting a predictive coding mode:
        setting the coding mode to be the predictive coding mode; and
        incrementing the predictive mode counter.

3. The method of claim 1, further comprising:
    responsive to selecting an absolute coding mode:
        setting the coding mode to be the absolute coding mode; and
        resetting the predictive mode counter to an initial value.

4. The method of claim 1, wherein determining whether predictive coding is allowed comprises determining if a flag indicates predictive coding is allowed.

5. The method of claim 4, wherein determining if the flag indicates predictive coding is allowed comprises:
    determining if a predictive count is below a maximum number of predictive frames;
    responsive to determining that the predictive count is less than the maximum number of predictive frames, setting the flag to indicate predictive coding is allowed; and
    responsive to determining that the predictive count is greater than the maximum number of predictive frames, setting the flag to indicate predictive coding is not allowed.

6. The method of claim 1, further comprising:
    determining whether predictive coding is allowed;
    responsive to determining that predictive coding is not allowed:
        setting the coding mode to be an absolute coding mode; and
        setting the predictive mode counter to an initial value.

7. The method of claim 1, wherein calculating the bit rate difference comprises calculating the bit rate difference according to:

$$bitdiff(m) = nbits_{abs}(m) - nbits_{pred}(m),$$

where $nbits_{abs}(m)$ is the bit rate for absolute coding and $nbits_{pred}(m)$ is the bit rate for predictive coding.

8. The method of claim 1, wherein selecting the coding mode based on the bit rate difference, the low-pass filtered bit rate difference, and the predictive mode counter comprises selecting the coding mode according to:

$$g_{mode}(m) = \begin{cases} PREDICTIVE, & predcond(m) \\ ABSOLUTE, & otherwise \end{cases}$$

where $$predcond(m) =$$

$$bitdiff(m) > C \cdot bitdiff_{LP}(m) \cdot \frac{predcont(m-1)}{MAX\_PRED\_STREAK} \quad bitdiff(m) =$$

$$nbits_{abs}(m) - nbits_{pred}(m),$$

$$\text{and } bitdiff_{LP}(m) = \gamma bitdiff(m) + (1-\gamma)bitdiff_{LP}(m-1)$$

where $g_{mode}(m)$ is the coding mode, $predcount(m-1)$ is a number of frames since a last ABSOLUTE coded frame, C is a tuning constant, $bitdiff(m)$ is the bit rate difference, $nbits_{pred}(m)$ is a number of bits estimated to be used for predictive coding, $nbits_{abs}(m)$ is a number of bits estimated to be used for absolute coding, $bitdiff_{LP}(m)$ is the low-pass filtered bit rate difference, $\gamma$ is the low-pass filter coefficient, and MAX_PRED_STREAK is a maximum number of predictive successive frames allowed.

9. The method of claim 8, wherein $$predcount(m) = \begin{cases} 0, & g_{mode}(m) = \text{ABSOLUTE} \\ precount(m-1) + step(m), & g_{mode}(m) = \text{PREDICTIVE} \end{cases}$$

$$step(m) = \begin{cases} 1, & \text{active frame} \\ 8, & \text{SID frame} \end{cases}$$

where SID frame is a silence insertion descriptor frame.

10. The method of claim 8, wherein
$\gamma \in [0.01, 0.20]$ and
$C \in [0,1]$.

11. The method of claim 8, wherein $g_{mode}$ (m) is further based on pred_allowed (m) according to:

$$g_{mode}(m) = \begin{cases} \text{PREDICTIVE}, & \text{pred\_allowed}(m) \text{ AND } predcond(m) \\ \text{ABSOLUTE}, & \text{otherwise} \end{cases}$$

where $$\text{pred\_allowed}(m) = \begin{cases} \text{TRUE}, & predcont(m-1) < \text{MAX\_PRED\_STREAK} \\ \text{FALSE}, & \text{otherwise} \end{cases}$$

12. The method of claim 1, wherein selecting the coding mode based on the bit rate difference, the low-pass filtered bit rate difference, and the predictive mode counter comprises selecting the coding mode according to:

$$g_{mode} = \begin{cases} \text{PREDICTIVE}, & \text{pred\_allowed}(m) \text{ AND } nbits_{pred}(m) < nbits_{abs}(m) - A \cdot predcount(m-1) \\ \text{ABSOLUTE}, & \text{otherwise} \end{cases}$$

$$\text{pred\_allowed}(m) = \begin{cases} \text{TRUE}, & predcount(m-1) < \text{MAX\_PRED\_STREAK} \\ \text{FALSE}, & \text{otherwise} \end{cases},$$

where $g_{mode}$ (m) is the coding mode, predcount (m) is a number of frames since a last ABSOLUTE coded frame, $nbits_{pred}$ (m) is a number of bits estimated to be used for predictive coding, $nbits_{abs}$ (m) is a number of bits estimated to be used for absolute coding, A is a constant, and MAX_PRED_STREAK is a maximum number of predictive successive frames allowed.

13. The method of claim 12, wherein $A \in (0,2]$.

14. The method of claim 1, wherein selecting the coding mode based on the bit rate difference, the low-pass filtered bit rate difference, and the predictive mode counter comprises selecting the coding mode according to:

$$g_{mode}(m) = \begin{cases} \text{PREDICTIVE}, & \text{pred\_allowed}(m) \text{ AND } nbits_{pred}(m) < nbits_{abs}(m) - G\alpha_{acc}(m-1) \\ \text{ABSOLUTE}, & \text{otherwise} \end{cases}$$

$$\text{pred\_allowed}(m) = \begin{cases} \text{TRUE}, & \varepsilon_{rel}(m-1) > \varepsilon_{THR} \text{ AND } \alpha_{acc}(m-1) < \alpha_{acc,max} \\ \text{FALSE}, & \text{otherwise} \end{cases},$$

$$\alpha_{acc}(m) = \begin{cases} 0, & g_{mode} = \text{ABSOLUTE} \\ \alpha(m) + \alpha_{acc}(m-1) & g_{mode}(m) = \text{PREDICTIVE} \end{cases}$$

where $g_{mode}$ (m) is the coding mode, $nbits_{pred}$ (m) is a number of bits estimated to be used for predictive coding, $nbits_{abs}$ (m) is a number of bits estimated to be used for absolute coding, G is a constant, $\alpha_{acc}$ (m) is a weighting factor, $\varepsilon_{rel}$(m) is a relative error, and $\varepsilon_{THR}$ is a threshold value for the relative error.

15. An encoder for selecting a coding mode for a current frame, the encoder adapted to perform operations comprising:
   obtaining bit rates for absolute coding and predictive coding;
   calculating a bit rate difference based on the bit rates for absolute coding and predictive coding;
   low-pass filtering the bit rate difference according to $bitdiff_{LP}$(m)=$\gamma$bitdiff(m)+(1−$\gamma$) $bitdiff_{LP}$(m−1), where $\gamma$ is a low-pass filter coefficient; and
   selecting a coding mode based on the bit rate difference, the low-pass filtered bit rate difference, and a predictive mode counter.

16. The encoder of claim 15, wherein the encoder is adapted to perform further operations comprising:
   responsive to selecting a predictive coding mode:
      setting the coding mode to be the predictive coding mode; and
      incrementing the predictive mode counter.

17. The encoder of claim 15, further comprising:
   responsive to selecting an absolute coding mode:
      setting the coding mode to be the absolute coding mode; and
      setting the predictive mode counter to an initial value.

18. The encoder of claim 15, wherein determining whether predictive coding is allowed comprises determining if a flag indicates predictive coding is allowed.

19. The encoder of claim 18, wherein determining if the flag indicates predictive coding is allowed comprises:
   determining if a predictive count is below a maximum number of predictive frames;
   responsive to determining that the predictive count is less than the maximum number of predictive frames, setting the flag to indicate predictive coding is allowed; and
   responsive to determining that the predictive count is greater than the maximum number of predictive frames, setting the flag to indicate predictive coding is not allowed.

20. The encoder of claim 15, further comprising:
   determining whether predictive coding is allowed;
   responsive to determining that predictive coding is not allowed:
      setting the coding mode to be an absolute coding mode; and
      setting the predictive mode counter to an initial value.

21. The encoder of claim 15, wherein calculating the bit rate difference comprises calculating the bit rate difference according to:

$$bitdiff(m) = nbits_{abs}(m) - nbits_{pred}(m),$$

where $nbits_{abs}$ (m) is the bit rate for absolute coding and $nbits_{pred}$ (m) is the bit rate for predictive coding.

22. The encoder of claim 15, wherein selecting the coding mode based on the bit rate difference, the low-pass filtered bit rate difference, and the predictive mode counter comprises selecting the coding mode according to:

$$g_{mode}(m) = \begin{cases} \text{PREDICTIVE}, & predcond(m) \\ \text{ABSOLUTE}, & \text{otherwise} \end{cases}$$

where $$predcond(m) =$$

$$bitdiff(m) > C \cdot bitdiff_{LP}(m) \cdot \frac{predcont(m-1)}{\text{MAX\_PRED\_STREAK}} \; bitdiff(m) -$$

$$nbits_{abs}(m) - nbits_{pred}(m),$$

and $bitdiff_{LP}(m) = \gamma bitdiff(m) + (1 - \gamma) bitdiff_{LP}(m-1)$ where $g_{mode}$ (m) is the coding mode, predcount (m−1) is a number of frames since a last ABSOLUTE coded frame, C is a tuning constant, bitdiff(m) is the bit rate difference, $nbits_{pred}$ (m) is a number of bits estimated to be used for predictive coding, $nbits_{abs}$ (m) is a number of bits estimated to be used for absolute coding, $bitdiff_{LP}$ (m) is the low-pass filtered bit rate difference, $\gamma$ is the low-pass filter coefficient, and MAX_PRED_STREAK is a maximum number of predictive successive frames allowed.

23. The encoder of claim 22, wherein $$predcount(m) = \begin{cases} 0, & g_{mode}(m) = \text{ABSOLUTE} \\ precount(m-1) + step(m), & g_{mode}(m) = \text{PREDICTIVE} \end{cases}$$

$$step(m) = \begin{cases} 1, & \text{active frame} \\ 8, & \text{SID frame} \end{cases}$$

where SID frame is a silence insertion descriptor frame.

24. The encoder of claim 22, wherein $\gamma \in [0.01, 0.20]$ and $C \in [0,1]$.

* * * * *